United States Patent [19]

Ogawa

[11] Patent Number: 5,047,678
[45] Date of Patent: Sep. 10, 1991

[54] GENERATOR FOR VEHICLE
[75] Inventor: Hitoshi Ogawa, Hyogo, Japan
[73] Assignee: Mitsubishi Denki K.K., Tokyo, Japan
[21] Appl. No.: 236,472
[22] Filed: Aug. 25, 1988
[51] Int. Cl.$^5$ .................. H02K 5/10; H02K 11/00
[52] U.S. Cl. .................................. 310/88; 310/68 D
[58] Field of Search ..................... 310/88, 89, 68 D

[56] References Cited
U.S. PATENT DOCUMENTS

| | | | |
|---|---|---|---|
| 4,076,989 | 2/1978 | Watson | 310/89 |
| 4,284,914 | 8/1981 | Hagenlocher et al. | 310/89 |
| 4,488,070 | 12/1984 | Iwaki et al. | 310/62 |
| 4,499,390 | 2/1985 | Iwaki et al. | 310/88 |

FOREIGN PATENT DOCUMENTS 3206071  10/1982  Fed. Rep. of Germany ........ 310/89

Primary Examiner—R. Skudy
Assistant Examiner—C. LaBalle
Attorney, Agent, or Firm—Sughrue, Mion, Zinn, Macpeak & Seas

[57] ABSTRACT

In a vehicle generator comprising a bracket, a shaft rotatably supported by the bracket, a rotor fixed to the shaft, fans fixed to the rotor, a stator disposed at an outer circumference of the rotor and fixed to the bracket, a rectifier and a brush holder attached to a bottom surface of the bracket, and a partition plate attached to the brush holder and extended axially and radially between the bracket and the brush holder, the improvement in that an opening portion is formed in the axial portion of the partition plate at a central portion thereof. A groove may be provided in a portion of the bracket opposed to the opening portion.

6 Claims, 5 Drawing Sheets

GENERATOR FOR VEHICLE

BACKGROUND OF THE INVENTION

The present invention relates to a generator for a vehicle, and particularly relates to an improvement in a partition plate provided on a brush holder and in brackets.

FIG. 1 is a sectional view of a conventional vehicle generator. In the drawing, the generator comprises a shaft 1 to which a pulley 2 is fixed with a nut, a rotor 3 fixed to the shaft 1, fans 3a fixed to the rotor 3 at its both ends respectively, front and rear brackets 4 and 5 for rotatably supporting-.the rotor 3 through bearings 6 and 7 respectively, a stator 8 disposed at an outer circumference of the rotor 3 and fixed between the front bracket 4 and the rear bracket 5, a rectifier 9 attached to a bottom portion of the rear bracket 5, a brush holder 10 attached to another bottom portion of the rear bracket 5, and a partition plate 11 fastened together with the brush holder 10 and composed of a radial portion 11a and an axial portion 11b as shown in FIG. 3. The rear bracket 5 has a casing 5a provided on the brush holder side and a ventilating hole 5b provided through the casing 5a. FIG. 2 is a broken enlarged view of the brush holder 10 and the casing 5a, in which the brush holder 10 has terminals 10a and 10b and pigtails 10c and 10d.

The operation of the vehicle generator is as follows. If the generator is driven by a not-shown vehicle engine, the fans 3a are rotated, so that the air moved by the fans 3a is subjected to centrifugal force to thereby move toward an outer circumference of the fans 3a, whereby air streams shown by arrows a and b are generated. The radial portion 11a of the partition plate 11 is used as a side plate for improving the efficiency of the fans 3a.

When a key switch is turned on, a battery voltage is applied to the terminal 10a and the pigtail 10c of the brush holder 10, so that a current is caused to flow into a field coil of the rotor 3 to thereby generate a magnetic field. Next, the generator is driven to rotate so that an AC induced electromotive force is generated in the stator 8. The thus generated AC induced electromotive force is rectified into a direct current by the rectifier 9, so that DC power is fed to an electric load of the vehicle or to a battery to charge the same. The axial portion 11b of the partition plate 11 is provided between the bracket 5 and the terminals 10a and 10b or pigtails 10c and 10d of the brush holder 10.

Being arranged as described above, the conventional vehicle generator has problems in the following points. That is, even if the generator is arranged as shown in FIG. 4, the generator often becomes into the state as shown in FIG. 5 when the generator is mounted onto the engine. In this case, the brush holder side casing 5a of the rear bracket 5 is turned downward, so that when water comes in through the ventilating hole 5b of the rear bracket 5 in running of the vehicle in rain, in washing of the vehicle, or the like, the water W gathers, due to surface tension, between the brush holder 10 and the axial portion 11b of the partition plate 11 and between the axial portion 11b and the rear bracket 5 as shown in FIG. 6. Accordingly, electrolytic corrosion occurs between the terminal 10a or the pigtail 10c of the brush holder 10 having a certain potential and the rear bracket 5 which is an earth side, so that the terminal 10a or the pigtail 10c is disconnected, resulting in defective power generation.

SUMMARY OF THE INVENTION

It is therefore an object of the present invention to solve the foregoing problems in the prior art.

It is another object of the present invention to provide a vehicle generator in which water is prevented from gathering between an axial portion of the partition plate and a rear bracket so that electrolytic corrosion is prevented from occurring.

In the vehicle generator having a partition plate provided between a bracket and a brush holder, according to the present invention, an opening portion is formed in the partition plate at its central portion. Further, a groove may be formed in a portion of a bracket opposed to the opening portion.

According to the present invention, water entering through a ventilating hole of a bracket flows out through the opening portion of the partition plate so that the water does not gather, and electrolytic corrosion can be prevented from occurring in the generator. Further, when the groove is formed in the bracket portion, the water which comes inside through the ventilating hole of the bracket and flows out through the opening portion of the partition plate can be made to come outside the generator through the groove of the bracket.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figure 1:
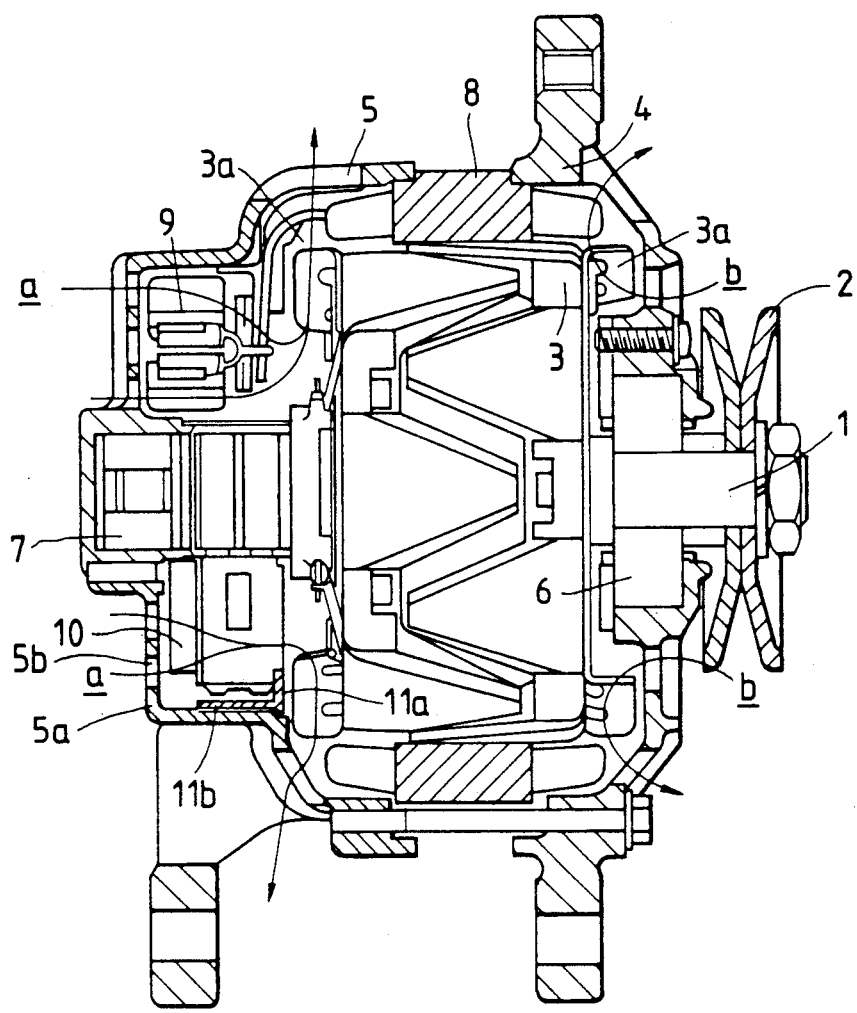
FIG. 1 is a section of a conventional general generator for a vehicle.
Figure 2:
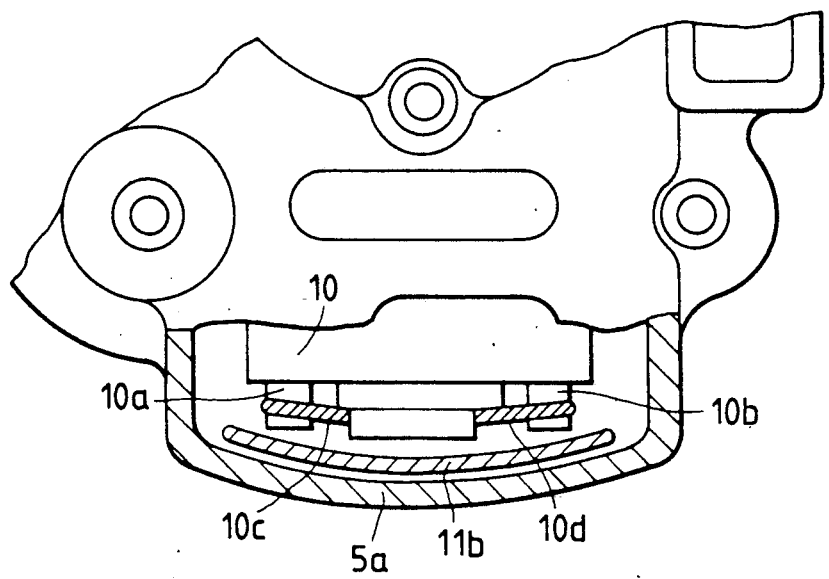
FIG. 2 is a broken section showing an arrangement of a bracket, a brush holder, and a partition plate in the conventional generator.
Figure 3:
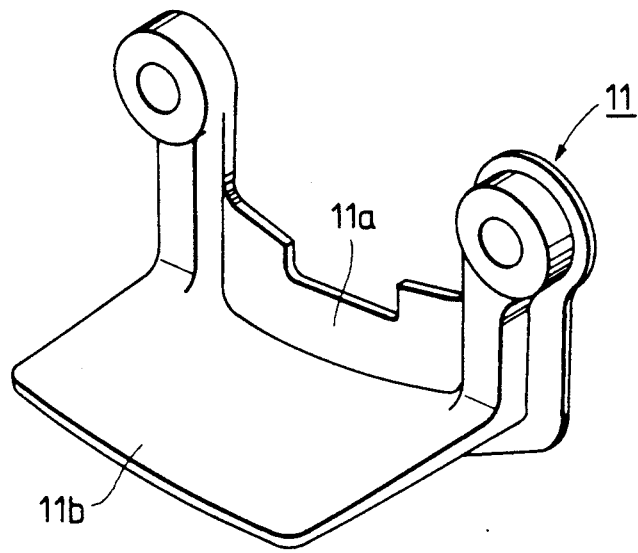
FIG. 3 is a perspective view of the partition plate in the conventional generator.
Figure 4:
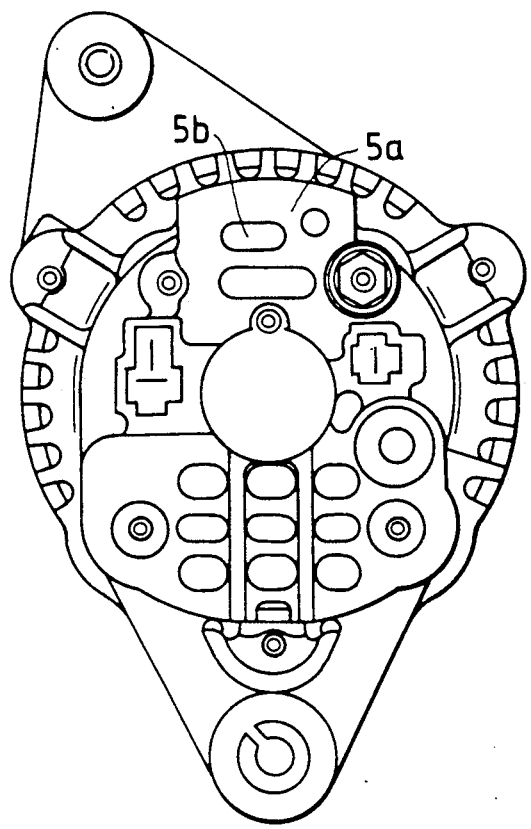
FIGS. 4 and 5 are a side view of the generator and a side view showing the state in which the generator is mounted on an engine respectively.
Figure 5:
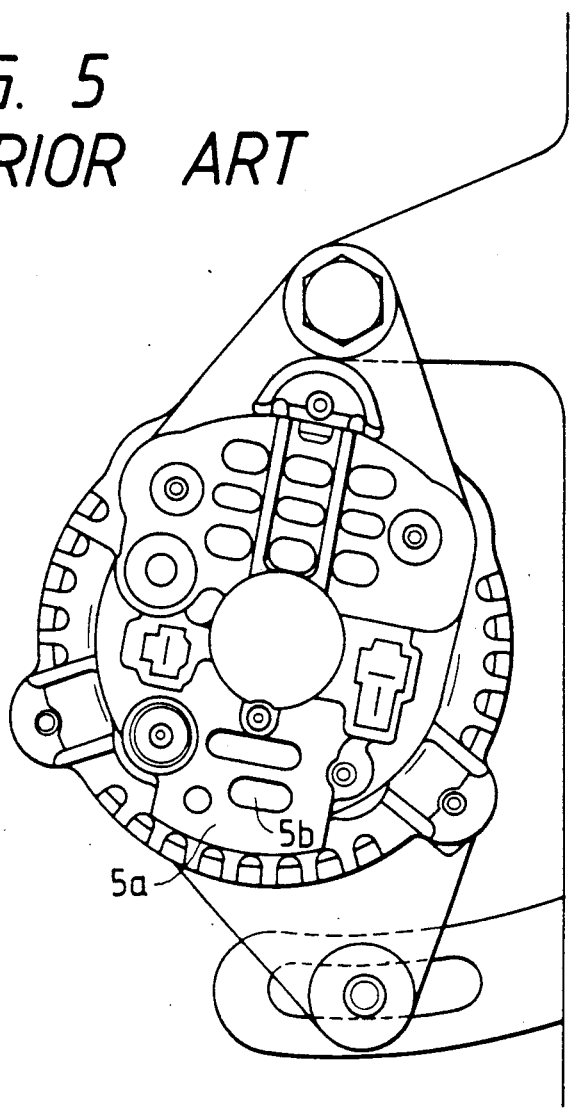
Figure 6:
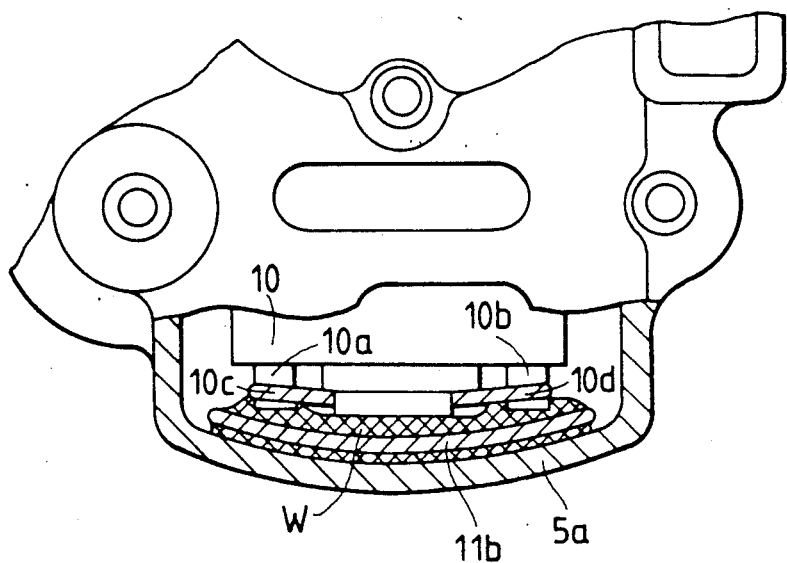
FIG. 6 is a broken section showing the state in which water gathers between the bracket and the brush holder.
Figure 7:
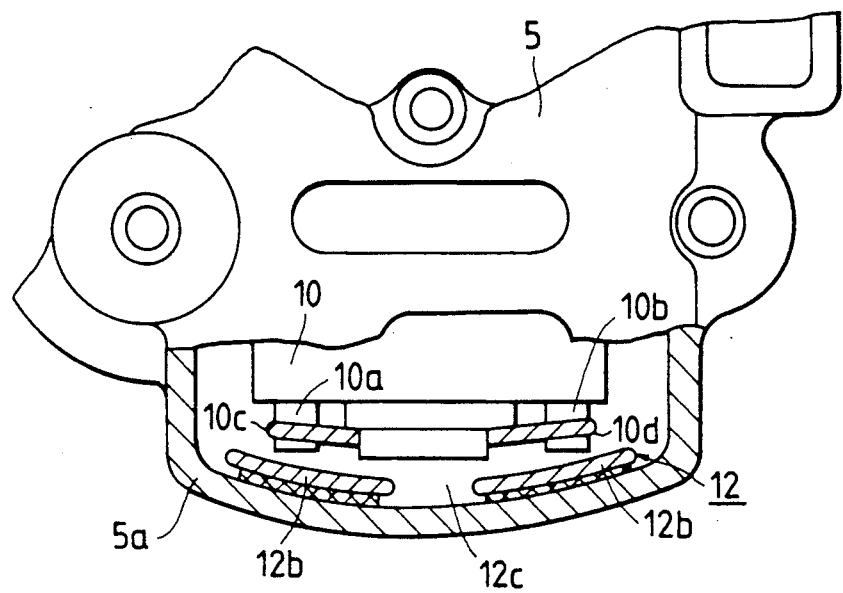
FIG. 7 is a broken front view partially in section showing a first embodiment of the present invention.
Figure 8:
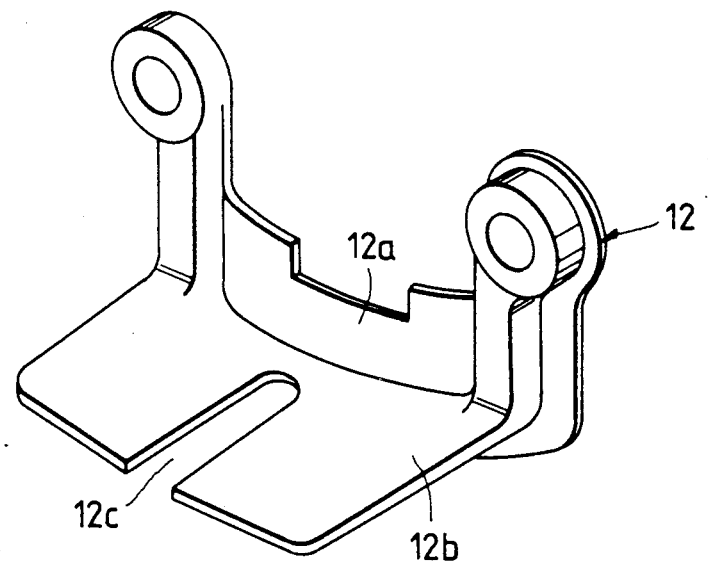
FIG. 8 is a perspective view showing a partition plate in the first embodiment.

Referring to the drawings, a first embodiment of the present invention will be described hereunder. In FIGS. 7 and 8, a partition plate 12 is fastened together with a brush holder 10 so as to be fixed to the brush holder 10. The partition plate 12 has a radial portion 12a, an axial portion 12b, and an opening portion 12c. The opening portion 12c is slit-like in the case of this embodiment.

Although the operation of this partition plate is similar to that of the conventional apparatus, in this embodiment of the present invention, it has been confirmed though an experiment that invention if the generator is submerged when a brush holder side casing 5a of a bracket rear 5 comes downward as shown in FIG. 7, the water, which comes into between the brush holder 10 and the axial portion 12b of the partition plate 12, flows out because the surface tension of the water is released by means of the opening portion 12c. Accordingly, water never gathers between the brush holder 10 and the axial portion 12b of the partition plate 12, so that electrolytic corrosion hardly progresses. Thus, the problem is solved.

Because the opening portion 12c is formed at a central portion of the axial portion 12b of the partition late 12, an insulating effect of an essential operation of the axial portion 12b is invariably maintained as understood from FIG. 7.

Figure 9:
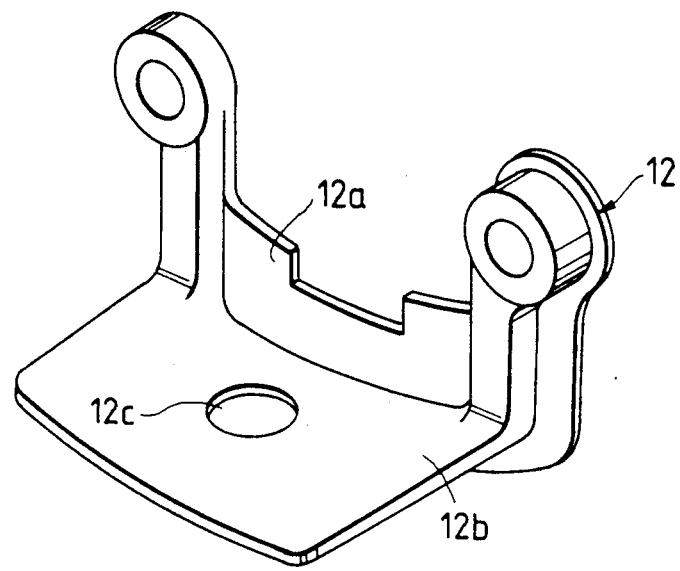
FIG. 9 is a perspective view showing a modification of the partition plate in the first embodiment.

Although the opening portion is illustrated slit-like in the embodiment, a similar effect can be brought even if the opening portion is a circular hole as shown in FIG. 9.

As described above, the first embodiment of the present invention has effects not only in that a generator having high reliability can be obtained because the use of the opening portion provided in the partition plate eliminates the problem of electrolytic corrosion in wetting time, but in that even if the generator is mounted to the engine at any angle, the problem never occurs, so that there is no restriction in mounting and the generator can be standardized and can be made inexpensive.

Figure 10:
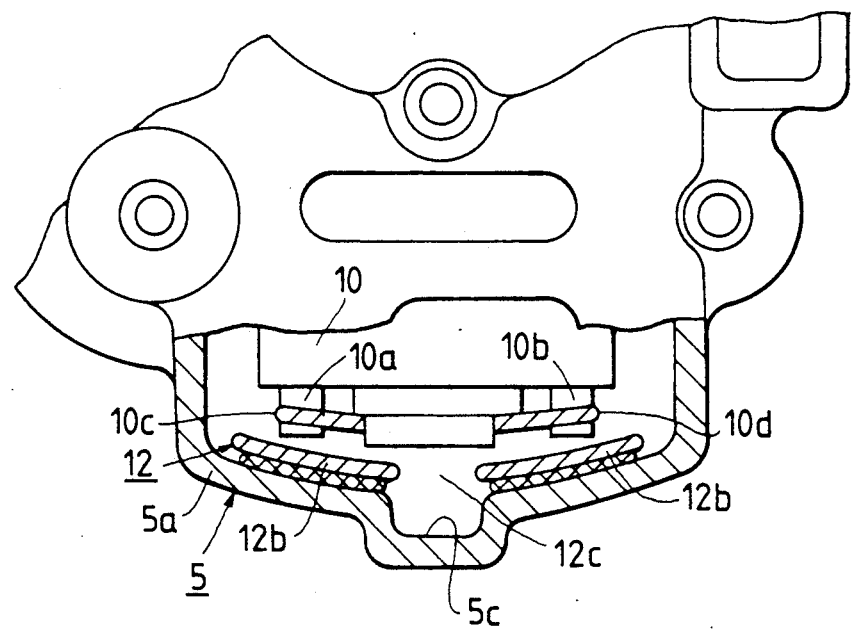
FIG. 10 is a broken front view partially in section showing a second embodiment of the present invention.

Referring to FIG. 10, a second embodiment of the present invention will be described hereunder. FIG. 10 is a broken sectional view showing a main portion of the vehicle generator according to this embodiment, in which the same numerals as those in FIG. 7 designate the same members. In this embodiment, a groove 5c is formed in a portion of a brush holder casing 5a of a rear bracket 5 opposed to an opening portion 12c.

In the vehicle generator of the second embodiment, even if water enters through a not-shown ventilating inlet of the bracket 5 and flows between a brush holder 10 and an axial portion 12b of a partition plate 12, the surface tension of the water is released by means of the opening portion 12c of the partition plate 12 so that the water W flows out through the opening portion 12c of the partition plate 12 and is caused to come out to the outside of the generator through the groove 5c of the brush holder side casing 5a. Accordingly, water never gathers between the brush holder 10 and the axial portion 12b of the partition plate 12, so that electrolytic corrosion never occurs. Further, the opening portion 12c is formed at the central portion of the partition plate 12, insulation between the brush holder 10 and the bracket 5, which is an essential function of the axis portion 12b, can be maintained.

Although the opening portion 12c is a slit in this embodiment, even if the opening portion 12c is a circular hole as shown in FIG. 9, the function similar to the above description can be obtained.

As described above, according to the second embodiment of the present invention the opening portion is provided in the partition plate for insulating the bracket from the brush holder and the grove is provided in the bracket portion opposed to the opening portion, so that even if water enters through the ventilating inlet of the rear bracket in running of the vehicle in rain, in car washing, or the like, the water never gathers in the generator but can be exhausted. Accordingly, the electrolytic corrosion can be prevented from occurring in the generator, so that the generator having high reliability can be obtained. Further, there is no obstacle even if the generator is mounted on an engine at any angle, so that there is no restriction in mounting and the generator can be standardized and can be made inexpensive.

What is claimed is:

1. In a vehicle generator comprising a bracket, a shaft rotatably supported by said bracket, a rotor fixed to said shaft, fans fixed to said rotor, a stator disposed at an outer circumference of said rotor and fixed to said bracket, a brush holder attached to a bottom surface of said bracket, said brush holder having first and second terminals and first and second pigtails on respective opposed sides thereof and a partition plate attached to said brush holder and composed of an axial portion and a radial portion between said bracket and said brush holder, the improvement wherein a single opening portion is formed in said axial portion of said partition plate at a central portion thereof between said first and second terminals and said first and second pigtails.

2. A vehicle generator according to claim 1, wherein said opening portion of said partition plate is a slit.

3. A vehicle according to claim 1, wherein said opening portion is a hole.

4. A vehicle generator according to claim 1, wherein a groove is provided in a portion of said bracket opposed to said opening portion.

5. A vehicle generator according to claim 4, wherein said opening portion of said partition plate is a slit.

6. A vehicle generator according to claim 4, wherein said opening portion of said partition plate is a hole.

* * * * *